United States Patent
Bryant

(10) Patent No.: US 8,714,204 B2
(45) Date of Patent: May 6, 2014

(54) FREE VENTING PIPE AND METHOD OF MANUFACTURE

(75) Inventor: Michael J. Bryant, Broughty Ferry (GB)

(73) Assignee: DeepFlex Inc., Houston, TX (US)

( * ) Notice: Subject to any disclaimer, the term of this patent is extended or adjusted under 35 U.S.C. 154(b) by 2107 days.

(21) Appl. No.: 11/640,340

(22) Filed: Dec. 18, 2006

(65) Prior Publication Data

US 2008/0145583 A1  Jun. 19, 2008

(51) Int. Cl.
*F16L 11/00* (2006.01)

(52) U.S. Cl.
USPC ............ 138/130; 138/133; 138/135; 138/138

(58) Field of Classification Search
USPC .................. 138/125, 127, 133, 138, 135, 130
See application file for complete search history.

(56) References Cited

U.S. PATENT DOCUMENTS

| | | | |
|---|---|---|---|
| 3,420,276 A | | 1/1969 | Skinner et al. |
| 3,830,261 A | | 8/1974 | Hochbert et al. |
| 3,933,554 A | * | 1/1976 | Torghele ...................... 156/143 |
| 4,096,888 A | | 6/1978 | Stefano et al. |
| 4,344,462 A | | 8/1982 | Aubert et al. |
| 4,402,346 A | | 9/1983 | Cheetham et al. |
| 4,606,410 A | | 8/1986 | Becker et al. |
| 4,657,049 A | | 4/1987 | Fourty et al. |
| 4,800,958 A | | 1/1989 | Haugen et al. |
| 4,929,478 A | | 5/1990 | Conaghan et al. |
| 5,264,262 A | | 11/1993 | Igarashi |
| 5,275,209 A | | 1/1994 | Sugier et al. |
| 5,406,984 A | | 4/1995 | Sugier et al. |
| 5,669,420 A | | 9/1997 | Herrero et al. |
| 5,730,188 A | | 3/1998 | Kalman et al. |
| 6,039,083 A | * | 3/2000 | Loper ........................... 138/135 |
| 6,062,269 A | | 5/2000 | Tanaka et al. |
| 6,098,667 A | | 8/2000 | Odru |
| 6,220,079 B1 | | 4/2001 | Taylor et al. |
| 6,253,855 B1 | | 7/2001 | Johal et al. |
| 6,338,365 B1 | | 1/2002 | Odru |
| 6,401,760 B2 | | 6/2002 | Espinasse |
| 6,446,672 B1 | * | 9/2002 | Kalman et al. ................ 138/127 |
| 6,491,779 B1 | | 12/2002 | Bryant |
| 6,631,743 B2 | | 10/2003 | Enders et al. |
| 6,804,942 B2 | | 10/2004 | Bryant |
| 6,978,806 B2 | | 12/2005 | Glejbol et al. |

(Continued)

FOREIGN PATENT DOCUMENTS

| | | |
|---|---|---|
| EP | 0903527 | 9/1998 |
| GB | 1207065 A | 9/1970 |

OTHER PUBLICATIONS

Coflexip Subsea & Topside Jumper Products Brochure, 4 pages, Oct. 2004.

(Continued)

*Primary Examiner* — James Hook
(74) *Attorney, Agent, or Firm* — Osha Liang LLP

(57) ABSTRACT

A free venting pipe and method of forming same, comprising a permeable tubular core member with at least one permeable hoop reinforcement layer around the core member; a substantially non-permeable membrane layer positioned outside of the hoop reinforcement layer and at least one permeable tensile reinforcement layer positioned outside of the membrane layer whereby a free volume annulus does not exist between any of the layers of the free venting pipe. The hoop and tensile reinforcement layers are comprised of a laminate construction.

8 Claims, 2 Drawing Sheets

(56) References Cited

U.S. PATENT DOCUMENTS

| | | |
|---|---|---|
| 7,073,978 B2 | 7/2006 | Bryant |
| 2002/0185188 A1 | 12/2002 | Quigley et al. |
| 2003/0026928 A1* | 2/2003 | Bryant ..................... 428/36.3 |
| 2003/0056845 A1 | 3/2003 | Fraser et al. |
| 2003/0121559 A1 | 7/2003 | Glejbol et al. |
| 2003/0131899 A1 | 7/2003 | Baba et al. |
| 2003/0159745 A1 | 8/2003 | Espinasse |
| 2003/0178084 A1 | 9/2003 | Charron |
| 2004/0040609 A1* | 3/2004 | Oishi et al. ................ 138/141 |
| 2004/0175523 A1 | 9/2004 | Gerez et al. |
| 2005/0189029 A1 | 9/2005 | Quigley et al. |
| 2005/0224127 A1 | 10/2005 | Wilson |
| 2006/0130924 A1* | 6/2006 | Dupoiron ................... 138/135 |
| 2006/0145479 A1 | 7/2006 | McIntyre |
| 2006/0249215 A1* | 11/2006 | Bryant ....................... 138/125 |
| 2007/0125439 A1 | 6/2007 | Quigley et al. |

OTHER PUBLICATIONS

MCS Advanced Engineering Solutions Data Sheet, 2 pages, Oct. 2005.

PCT Notification of Transmittal of International Preliminary Report on Patentability issued for international application No. PCT/US07/22707, mailed on Aug. 3, 2009, 12 pages.

Chinese Office Action dated Jul. 19, 2010, in corresponding Chinese Patent Application No. 200780046821.7. 6 pages.

Extended European Search Report Issued in European Application No. 07861530.9; Dated Aug. 16, 2012 (9 Pages).

* cited by examiner

FREE VENTING PIPE AND METHOD OF MANUFACTURE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is free-venting pipe for conducting oil and gas or other fluids in subsea and offshore operations and method of manufacturing the pipe.

2. Description of the Related Art

This is an improvement on the invention disclosed in U.S. Pat. No. 6,804,942, which is herein incorporated by reference. When the pipe disclosed therein is used to transport compressed gas, or fluids containing gas, some gas can permeate through the inner core or the pipe over time and gather between the inner core and extrusions causing a steady rising inward pressure on the core. The oil and gas industry and those skilled in the art generally refer to spaces between the inner core and the extrusions as annulus regions. Although not in itself a problem under normal circumstances, pressure that builds up in the annulus regions can cause a problem if the pressure in the bore of the pipe is released more quickly than the pressure between the layers. When that happens, the inner core can collapse due to the adverse pressure differential and its poor hoop strength. This problem can become more serious as the depth of water in which pipes are used to transport oil and gas increases, along with the increased ambient pressures at deeper water depths.

Pipe collapse has happened in the past with prior art pipes that have steel based flexible pipes and therefore prior art pipes used for gas transmission are normally constructed using a central interlocking metallic carcass under the inner core. The metallic carcass provides sufficient radial strength to withstand any collapse forces generated by the scenario described above but the overall diameter of the pipe necessarily requires an increase of twice the thickness of the carcass. Furthermore, the inclusion of a carcass increases each reinforcement layer for the same performance because the reinforcement layers have to be wound on larger diameters. An example of such a configuration is shown in U.S. Pat. No. 6,978,806.

Some degree of protection can be provided to pipes by relieving the pressure between the two extrusions through a valve or valves in the end fittings but this is insufficient for all circumstances and collapse of the inner core may still occur.

The problem has also solved by Michael J. Bryant, the inventor of the current invention, in pending, published US Patent Publication Number US-2006-0249215-A1, wherein a method is taught to prevent the collapse of the core by embedding a polymer in laterally spaced openings formed in reinforcing tapes that surround the core. The embedded polymer is then bonded to the core to strengthen the hoop strength of the core to prevent its collapse.

BRIEF SUMMARY OF THE INVENTION

What is needed is an apparatus that provides a structure that avoids a pressure build up on the core, thereby eliminating the need to add structural elements to increase the pressure resistance of the core.

The device according to this invention comprises a permeable tubular core member with at least one permeable hoop reinforcement layer around the core member. A non-permeable membrane layer is positioned outside of the hoop reinforcement layer and at least one permeable tensile reinforcement layer is positioned outside of the membrane layer whereby a free volume does not exist between any of the layers of the free venting pipe.

An extruded, permeable, polymer jacket is usually provided outside of the tensile reinforcement layer to provide abrasion resistance.

The hoop reinforcement and tensile reinforcement layers typically comprise composite laminate construction that includes stacked laminates having resin between the laminates as shown in U.S. Pat. No. 6,804,942. The stacked laminates may be wrapped with a tape member in a "z" pattern whereby each of the stacked laminates is prevented from bonding to adjacent stacked laminates. The stacked laminates may also be wrapped with a tape with a resulting "s" pattern wherein the orientation of the wrapped tape is reversed from the "z" orientation. The opposite orientation of the "z" versus the "s" patterns results from the stacked laminates being wrapped in opposite directions during manufacturing.

The method of manufacture of the present invention comprises the steps of wrapping at least one hoop reinforcement layer about a polymeric, pressure resistant core, covering the hoop reinforcement layer with an impermeable membrane and wrapping the impermeable membrane with at least one tensile reinforcement layer. Typically, two tensile reinforcement layers are provided to balance the wrapping forces created when wrapping the layers. A polymer jacket may also be applied or extruded about the tensile reinforcement layer. Both the tubular core and the polymer jacket are typically perforated to allow pressure to pass through to the impermeable membrane.

Because fluid pressure that is imposed from outside the free venting pipe, such as from ambient pressure from the ocean depth is not trapped in annulus layers outside of the inner core, the inner core is not subject to extreme pressures when a pressure drop occurs inside of the bore of the inner core. A sudden pressure drop on the inner core can occur for example, when the pipe, which is in the subsea, is vented from the surface. The single non-permeable membrane, which surrounds a permeable inner core and at least one hoop reinforcement layer, is surrounded by at least one tensile layer and may be surrounded by a permeable outer jacket. Fluid pressure from outside of the free venting pipe passes through the outer jacket, and through the one or more tensile layers to the impermeable membrane extrusion. Similarly, pressure in the bore of the inner core, which is permeable to gas, and liquid, passes through the inner core, through the one or more hoop reinforcement layers, and through any anti-extrusion layers to the impermeable membrane extrusion. Because pressure is allowed to pass through the layers outside of the impermeable membrane extrusion and pressure is also allowed to pass through the layers inside of the impermeable membrane extrusion, there is an absence of annular regions between layers that can cause undesirable pressure to be imposed on the inner core.

Perforating all extrusion layers other than the membrane extrusion ensures that there are no annulus regions of free volume in which pressure can build up. In conventional flexible fiber reinforced pipe and steel alternatives designed in accordance with API-17, the annulus can build up pressure over time.

Additional tensile reinforcement, hoop reinforcement, anti-extrusion, lubrication, or extrusion layers can added as desired so long as all layers other than the membrane extrusion layer are permeable. The free venting pipe design can also include weighted layers, according to the environmental demands of the underwater and offshore environment.

DETAILED DESCRIPTION OF THE INVENTION

Figure 1:
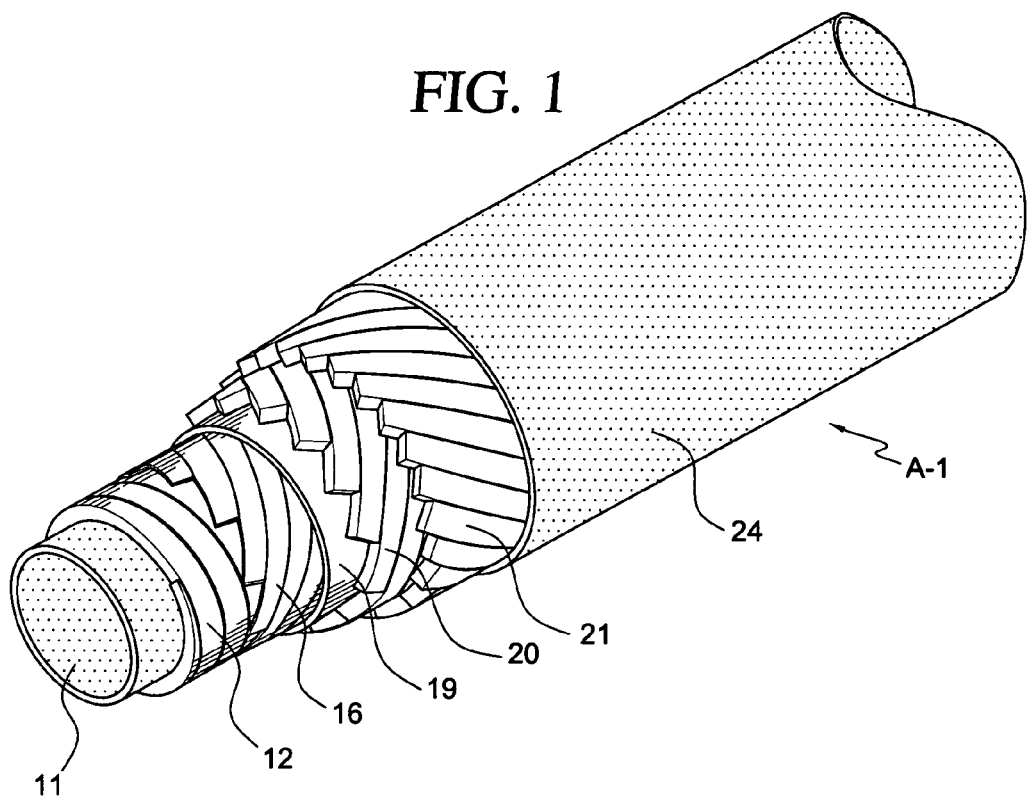
FIG. 1 is an isometric view of an embodiment of the invention showing the outside of the layers of the free venting pipe with a supplemental anti-extrusion layer.
Figure 2:
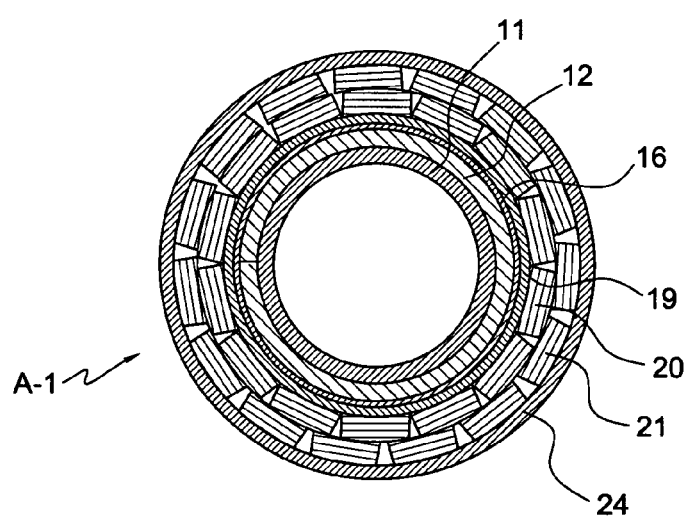
FIG. 2 is a cross-sectional view of FIG. 1.

Referring now to FIG. 1, the letter A-1 generally refers to a free venting pipe of the current invention. The tubular core 11 is typically wrapped with a hoop reinforcement layer 12. The hoop reinforcement layer 12 is shown covered with an anti-extrusion layer 16. The anti-extrusion layer 16 helps to bridge gaps formed in the hoop reinforcement layer 12 when the free venting pipe A-1 is bent, thereby preventing the membrane 19 layer from extruding through the gaps formed in the hoop reinforcement layer 12. The anti-extrusion layer is typically formed from a single layer of glass-reinforced tape, but multiple layers or alternative materials may be used, so long as they are pressure resistant to prevent the impermeable membrane 19 from being forced between the gaps that can form in the hoop reinforcement layer 12. For example, in one embodiment a layer of glass-reinforced tape may be alternated with a layer of polyester (such as Mylar®), or polyamide, or other polymer. An impermeable membrane 19 is shown extruded outside of the anti-extrusion layer 16. Tensile reinforcement layers 20,21 are typically helically wound around the membrane 19. A jacket extrusion 24 is then extruded outside of the tensile reinforcement layers 20,21. The jacket extrusion 24 is perforated to allow fluid pressure or gas to pass through the jacket extrusion 24, and through the tensile reinforcement layers 20,21. The tubular core 11 and the jacket extrusion 24 are perforated to allow gas pressure to permeate through the layers to the membrane 19. In a preferred embodiment, sets of four ⅛" holes are provided circumferentially, evenly spaced around the tubular core 11 and the jacket extrusion 24. The sets are spaced approximately 6" apart along the length of the tubular core 11 and the jacket extrusion 24. Other sizes of perforations and a different quantity of perforations and spaces may also be provided.

The anti-extrusion layer 16 may be omitted. A lubricated layer that is typically a wrapped tape made of tensilized polyethylene or polyamide or other polymer can instead be wrapped around the hoop layer 12 in place of the anti-extrusion layer 16. The lubricated layer helps to prevent the layers that are being separated by the lubricated layer from sticking to one another. The lubricated layer may also comprise an extruded jacked constructed of polyamide or other low friction material. A lubricated layer may also be used between other layers of the free venting pipe A-1 as desired, to provide a separation and anti-stick layer.

Figure 3:
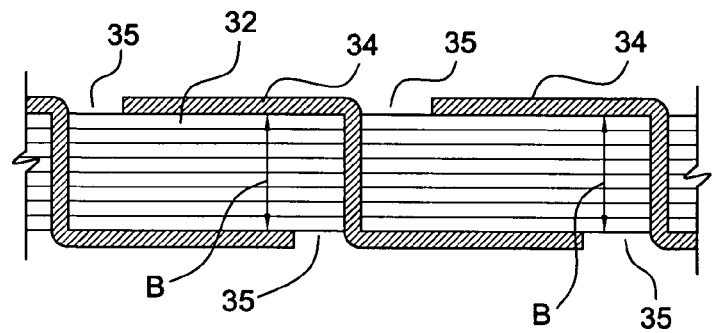
FIG. 3 is a cross-sectional view of stacked tapes forming composite laminates and separated by z-tapes.
Figure 3A:
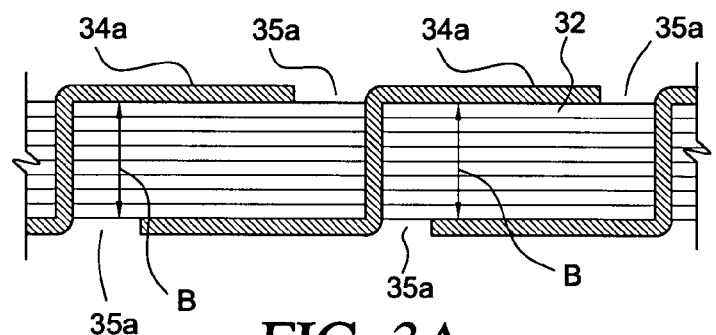
FIG. 3a is a cross-sectional view of stacked tapes forming composite laminates and separated by s-tapes.

In FIG. 1, the hoop reinforcement layer 12 and the tensile reinforcement layers 20,21 are comprised of a composite laminate construction as is disclosed in U.S. Pat. Nos. 6,804, 942 and 6,491,779. Referring to FIG. 3, individual tape strips 32 are stacked together and each resulting composite laminate B is separated from the other composite laminate B by a z-tape 34. The resulting composite laminate can also be separated from another composite laminate B by an s-tape 34a as shown in FIG. 3a. The use of a z-tape 34 or s-tape 34a depends upon the direction of wrapping of the composite laminate layer. Generally, the z-tape 34 will be used when wrapping in one direction, while the s-tape 34a will be used when wrapping in the opposite direction. The tape strips 32 are typically bonded together with epoxy or resin and the z-tape or s-tape keeps the composite laminates 32 from bonding to each other as they cure. The tape strips 32 may also be unbonded.

The composite laminates B are not pressure tight, and allow pressure to pass around the composite laminates B through the gaps 35 (FIG. 3) and 35a (FIG. 3a) to the impermeable membrane 19.

It is to be understood that multiple tensile layers, multiple hoop layers and/or multiple anti-extrusion, or extrusion layers may also be provided, so long as each of the layers provided is permeable to gas and a single impermeable membrane is provided outside of a permeable core. The single impermeable membrane may be of a co-extruded multiple layer construction or may otherwise be formed such that a unitary impermeable layer is provided. Also, a layer may be added to provide weighting to a desired length or lengths of the free venting pipe A-1. For example, weighting could be added to the inventive pipe to form a catenary, as shown in U.S. Pat. No. 7,073,978 to Michael J. Bryant.

Figure 4:
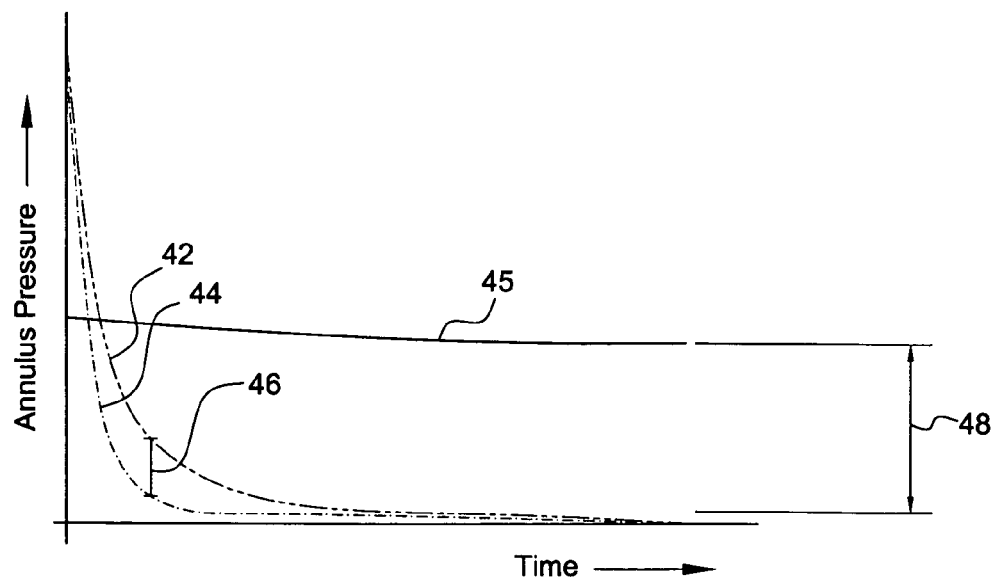
FIG. 4 is a set of graphs showing a comparison of the potential annulus pressure acting on the inner core of a conventional flexible pipe without the current inventive free venting pipe to the maximum differential pressure acting on an inner core of the current inventive free venting pipe.

FIG. 4 provides graphs that show a comparison of the potential annulus pressure acting on the inner core of a conventional flexible pipe without the current inventive free venting pipe to the maximum differential pressure acting on an inner core of the current inventive free venting pipe A-1. In FIG. 4, the Annulus Pressure is shown on the y-axis and Time is shown on the x-axis. The annulus pressure is that pressure that builds up between non-permeable or semi-permeable layers of conventional, flexible pipe. Curve 44 shows the relative pressure of the bore of either a conventional, flexible pipe or the inventive free venting pipe A-1. Curve 45 graphically shows the relatively high annulus pressure that can potentially develop in a conventional, flexible pipe. The relatively high annulus pressure shown in Curve 45 will be acting on the outside of the inner core of the conventional, flexible pipe and therefore the high pressure must be counteracted with either an inner metal carcass or other hoop reinforcement must be provided to prevent the inward collapse of the core. Curve 42 graphically shows the relatively low pressure outside core 11 of the inventive free venting pipe A-1. The differential pressure 46 is the difference between the pressure in the bore of the inventive free venting pipe A-1 and the pressure outside of the core 11. The pressure difference 48 graphically shows the relative potential between the annulus of a conventional, flexible pipe and the pressure of the inventive free venting pipe A-1. It is evident from the Annulus Pressure versus Time curves in FIG. 4 that the inventive free venting pipe A-1 reduces the resulting or potential annulus pressure on the core 11 to thereby reduce the need for additional hoop layers or other hoop reinforcement to add strength to the inner core of a conventional, flexible pipe.

The foregoing disclosure and description of the invention are illustrative and explanatory thereof, and various changes in the details of the illustrated apparatus and construction and method of operation may be made without departing from the spirit of the invention.

What is claimed is:

1. A free venting pipe comprising:
a permeable tubular core member;
a permeable hoop reinforcement layer outside of said core member;
a membrane layer outside of said hoop reinforcement layer wherein said membrane layer is substantially non-permeable to oil or gas; and
a permeable tensile reinforcement layer outside of said membrane layer whereby a free volume annulus does not exist between any of the layers of the free venting pipe,
wherein said hoop reinforcement layer comprises a composite laminate construction.

2. A free venting pipe according to claim 1 wherein said tensile reinforcement layer comprises a composite laminate construction.

3. A free venting pipe according to claim 2 wherein said composite laminate construction comprises stacked laminates having resin between the laminates and wherein the stacked laminates are wrapped in a "z" pattern whereby each of said stacked laminates does not bond to adjacent stacked laminates.

4. A free venting pipe according to claim 2 wherein said composite laminate construction comprises stacked laminates having resin between the laminates and wherein the stacked laminates are wrapped in an "s" pattern whereby each of said stacked laminates does not bond to adjacent stacked laminates.

5. A free venting pipe according to claim 1 wherein said composite laminate construction comprises stacked laminates having resin between the laminates.

6. A free venting pipe according to claim 5 wherein said stacked laminates are wrapped in a "z" pattern whereby each of said stacked laminates is prevented from bonding to adjacent stacked laminates.

7. A free venting pipe according to claim 1 wherein an anti-extrusion layer is between said hoop reinforcement layer and said substantially non-permeable membrane whereby pressure applied outside of said substantially impermeable membrane is prevented from being extruded between gaps formed in said hoop reinforcement layer.

8. A free venting pipe according to claim 1 wherein a lubricated layer is between said hoop reinforcement layer and said substantially non-permeable membrane whereby said hoop reinforcement layer and said substantially non-permeable membrane do not stick to one another.

\* \* \* \* \*